US005433806A

United States Patent [19]

Pasquali et al.

[11] Patent Number: 5,433,806

[45] Date of Patent: Jul. 18, 1995

[54] PROCEDURE FOR THE PREPARATION OF BORDERS OF CHIP-BOARD PANELS TO BE COVERED SUBSEQUENTLY

[75] Inventors: Guido Pasquali; Lorenzo Pasquali, both of Mansue', Italy

[73] Assignee: Media Profili SRL, Mansue', Italy

[21] Appl. No.: 91,998

[22] Filed: Jul. 15, 1993

[30] Foreign Application Priority Data

Jul. 21, 1992 [IT] Italy .............................. TV92A0085

[51] Int. Cl.[6] .......................... B32B 31/16; B27F 1/00

[52] U.S. Cl. .................................... 156/153; 156/257; 156/293; 144/346; 144/347

[58] Field of Search ............... 156/153, 154, 257, 293; 144/346, 347

[56] References Cited

U.S. PATENT DOCUMENTS

| | | | |
|---|---|---|---|
| 3,837,634 | 9/1974 | Cobb | 144/346 X |
| 3,947,012 | 3/1976 | Cobb | 144/346 X |
| 4,471,012 | 9/1984 | Maxwell | 144/347 X |

*Primary Examiner*—Jeff H. Aftergut

*Attorney, Agent, or Firm*—Palmatier, Sjoquist & Helget

[57] ABSTRACT

Improved procedure for the preparation of borders of elements in wood particles, particularly for the formation of small doors, and panels so obtained, characterized by the fact of:

being firstly milled lengthwise in correspondence to at least one of the four external sides, said milling consisting of a groove that concerns only the intermediate zone formed by an agglomeration of large chip particles:

being spread with glue in the interior of said sites so obtained;

finally, proceeding with the insertion inside the site of an insert of wood, pseudo wood or plastic material, conforming to the same section:

then the said panel so obtained could be subjected to a finishing cycle essentially including, firstly the shaping of the borders concerned and lastly conveniently covering with melamine paper, PVC, laminates and derivatives.

5 Claims, 3 Drawing Sheets sec. A-A sec. B-B

PROCEDURE FOR THE PREPARATION OF BORDERS OF CHIP-BOARD PANELS TO BE COVERED SUBSEQUENTLY

DESCRIPTION

This invention relates to an improved procedure for the preparation of borders of panels made of woody particles (chips) to be subsequently used to obtain doors and panels of various types.

The innovation finds particular if not exclusive application in the sector of chip-board panels covered for example with laminates, of varying thicknesses, consenting the shaping of the borders beforehand: all to be used in the composition of internal furniture elements, such as small doors, sides of structures, support surfaces.

At the present stage of technology, there are different procedures for the production of said products which can be sub-divided exclusively into two large categories:

- the first beginning with flat elements in chip-board (or MDF), raw and subsequently shaped in correspondence to one, two or four borders and covering one or two surfaces, in phases that are subsequent and interchangeable between themselves (post-forming and pressing);
- the second beginning with flat elements in chips or MDF already nobled with melaminic paper, adapted to be foldable or subsequently milled to obtain shaped borders and/or covering pieces. A system so-called of preforming and soft-forming.

Also well-known is a chip-board panel in layers of differentiated agglomerate, consisting, viewed along the transversal section of three sandwiched layers with an intermediate one of larger chippings or particles and two superficial ones made of a mixture of smaller particles, respectively above and below the intermediate layer. A typical procedure (post-forming) firstly requires the shaping in sections of various types of chip-board panels along one or more of its borders, in proximity to the surface area of largest extension. Following this one effects the glueing, either cold and/or hot, of the covering (paired melamine-phenolic, mono-layered ureic paper, PVC, and others) in correspondence with at least one of the two flat parts of the chip-board panel leaving one part of the covering projecting in correspondence with the previously shaped borders and sufficient to cover them. Lastly the said panel is inserted in a post-forming machine where, according to the shaping desired, the following can take place in variable sequences: the spreading of the glue, the bending, the covering and the trimming of the excessive part of the covering. Due to the composition methods of the chip-board previously displayed, the application of said techniques presents notable limits with regard to the obtaining of settings with thin coverings of various origins and finishes, and coverings of large thicknesses with delicate finishes either shiny or matte. The characteristics of the intermediate area of the chip-board are such as to produce inevitably at the time of shaping, discontinuous areas in the shaping and cavities in said zone, due to the effect of tearing of the particles. This determines, in the covered product, defects in the zone in question, which can compromise the acceptance of the product on the market and also the rejection of the worst cases during processing.

In the case of the so-called technique of pro-forming, the beginning of the processing occurs, instead, from a semi-processed panel, being pre-nobled by the supplier of primary materials on at least one of the two surfaces, or else already covered by a composition of kraft of phenolic origin and decorated with melaminic acrylic resins. In such a case the panel always presents a composition of a layered type as described previously and comes firstly ground in correspondence with one or more borders, said grinding substantially consisting in the removal of chippings along the border in the part underneath the covering of the said panel. In such a case the grinding allows the obtainment of a tongue of covering which overhangs with respect to the border of the panel itself, together with the preparation of the border and in line with its nobling phase.

The preparation of said borders can be of two types. The first, always done along the border, is a longitudinal milling to give an outline, and The glueing, using a spraying of glue, of a personalized profile of wood fibre with planed borders in variable sections, and the subsequent folding-over of the tongue previously obtained by trimming done in the opportune sequence according to the shape to be obtained.

The noticeable inconveniences consist of, first of all in the necessity of planing the profile before inserting it in the shape wanted. Secondly, the difficulty of creating a perfect match of the contact point between the surfaces of the chip-board and the solid wood of planed MDF, causing in the semi-processed item an evident aesthetic defect at the beginning of the curve. Lastly the precariousness of glueing planed solid wood onto the border of the chip-board a few seconds before the successive nobilitation of the same border, using glues with different reaction and curing times which can thus make evident certain aesthetic defects (for example, marks on the contact points between different materials or micro-cracks in the covering).

A second, in which only the longitudinal shaping of the border of chip-board is provided for, with subsequent smoothing to avoid evident defects of continuity which can form in the intermediate layer of the panel and during nobilitation with folding of the tongue previously produced and trimming done in the requested sequence according to the shape. Such techniques however include all the problems previously observed in the post-forming procedure, and also encounter other problems. In the first place the necessity to spray a thermofusible glue used for plugging onto the point where one interrupts the excavation of the shape, and of a step of some tenths of a millimeter which is necessary for reasons tied to the form of the milling tools, which step cannot have sharp edges so as to create a connection point with zero thickness. This inevitably creates a continuous aesthetic defect in the case of nobled panels that have thin coverings. Besides, even in such a case one deals with a technique that foresees the application of different glues that can give origin to tensions with consequent defects that are not immediately evident. Lastly, in the case a with radius under 2 mm it is not a practical technique, as there would not be sufficient space to effect the plugging with the thermofusible glue and obtain al the same time an aesthetically valid radius.

Another solution foresees, beginning with a chip-board panel or MDF, raw or covered, the glueing along the border of a solid wooden strip or similar, covering practically all the thickness. Such a solution must be able to pre-consider the following in order to obtain an acceptable aesthetic result; either the subsequent calibration and planing of the panel if raw, or the processing of the border of solid wood if the panel was prenobled, which border must be trimmed with slightly inclined tools, making it notably complicated for an eventual attachment in as much as those parts not being perfectly parallel and in line with the area of the panel give place to a discontinuous zone or to a problem in glueing according to the finishing system of application used. This therefore notably influences the cost and aesthetic appearance of the final products.

Yet another technique, used for the production of semi-processed products with curved areas is the so-called "soft-forming" technique. It consists in particular, of beginning with a panel as in the "pro-forming" case, previously nobled by he supplier of primary materials with decorative waste papers impregnated with melamine resin. The panel is subsequently, in a single phase, shaped in the parts of the border, bringing it to the raw state by spreading glue onto the border strip of the covering, which is applied, curved and lastly trimmed to the shape to be obtained. The limits of such a technique can be summarised as follows:

- the vision of the surface in view, of the meeting between the applied border and the prenobled part;
- in the case of light colours the danger of an infiltration of particles that can dirty the product and compromise its quality;
- the danger of infiltration of humidity or liquids, if the semi-processed product is used in certain environments (for example bathrooms-kitchens) and its consequent alteration;
- lastly, the same problem already seen in the post-forming case, that dealing always with a layered panel the problem of continuity in the intermediate layer of the panel remains, unless are used borders of particular thickness or double borders, to the detriment of ease of processing and final cost of the product.

As a last analysis, as cited al the slate of the art, other procedures still concern the production of curved elements in plastic laminate.

The aim of the present invention is also to prevent the above-mentioned inconveniences.

This and other aims are reached with the present innovation according to the characteristics in the attached claims, resolving the problems shown by means of an improved procedure for the preparation of borders of panels in wood in particular, subsequently to be shaped, and panels so obtained, beginning with a raw panel in chip-board with differentiated layers of agglomerate, to be:

- firstly milled lengthwise in correspondence to at least one of the four sides, said milling consisting of a groove preferably with a rectangular section, concerning only the intermediate zone formed by an agglomeration of particles of large chippings:
- subsequently spread with glue on the interior of said site so obtained;
- lastly, proceeding in line, with the insertion to the interior of the site of an insert of wood, pseudo wood, or plastic material, conforming to an identical section;
- then for said panel so obtained to be able to be subjected to a successive cycle including finishing, consenting the shaping of the border, and its nobilitation with laminates on at least one flat surface.

In such a way, different advantages are then achieved, among which is a matchless case of achievement using common tools, without resorting to particular plants for the processing of the panel. Not least is the possibility of obtaining a vast range of border shapes during processing and without having the aesthetic result negatively influenced by the layered conformation of the chip-board, as well as being able to use any thin or thick covering, and using finishings more or less dangerous during application.

These and other advantages arc shown in the subsequent detailed description of improved solutions of realization with the help of the schematic diagrams enclosed, the execution particulars of which are not intended to be limiting but only illustrative.

Figure 1:
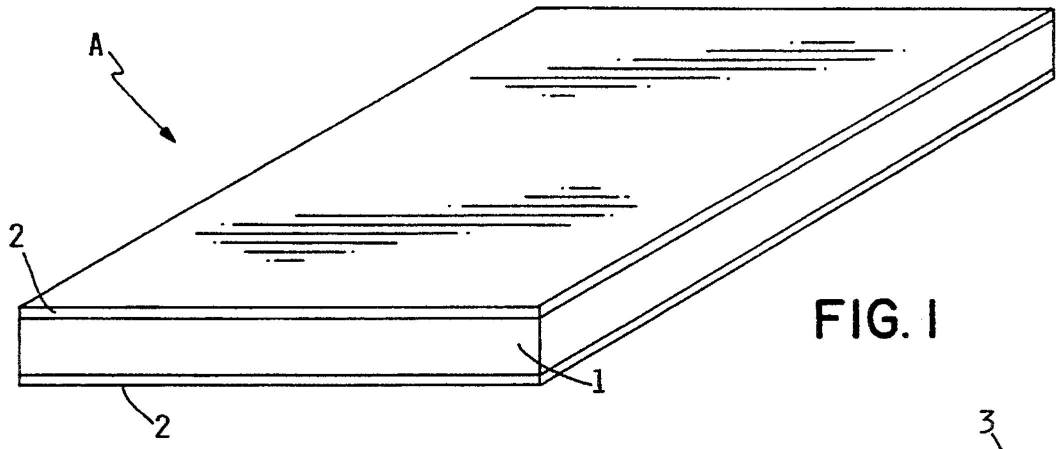
FIG. 1 represents a perspective and enlarged view of a raw chip-board panel composed of three layers of differentiated agglomerate, to be subjected to further processing.
Figure 2:
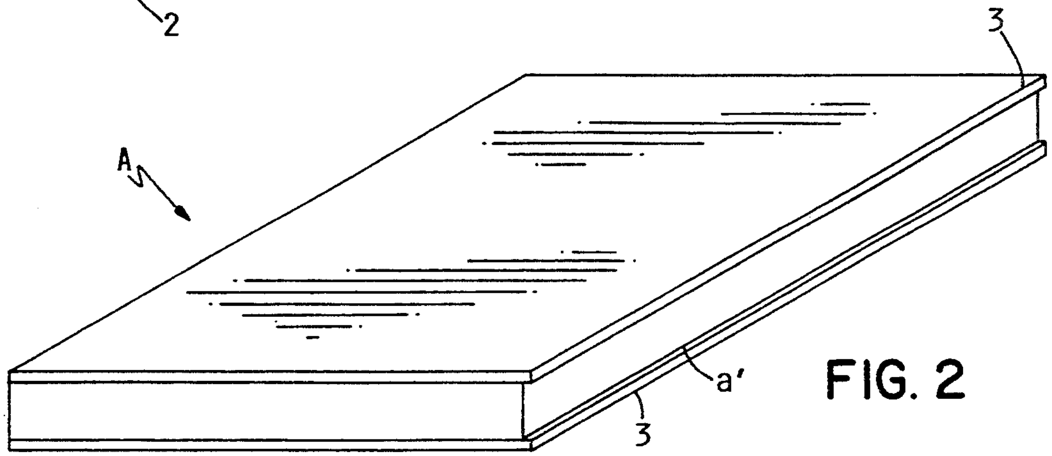
FIG. 2 represents a view of the same panel surface previously illustrated but milled lengthwise along a border in correspondence to the intermediate chip layer.
Figure 3:
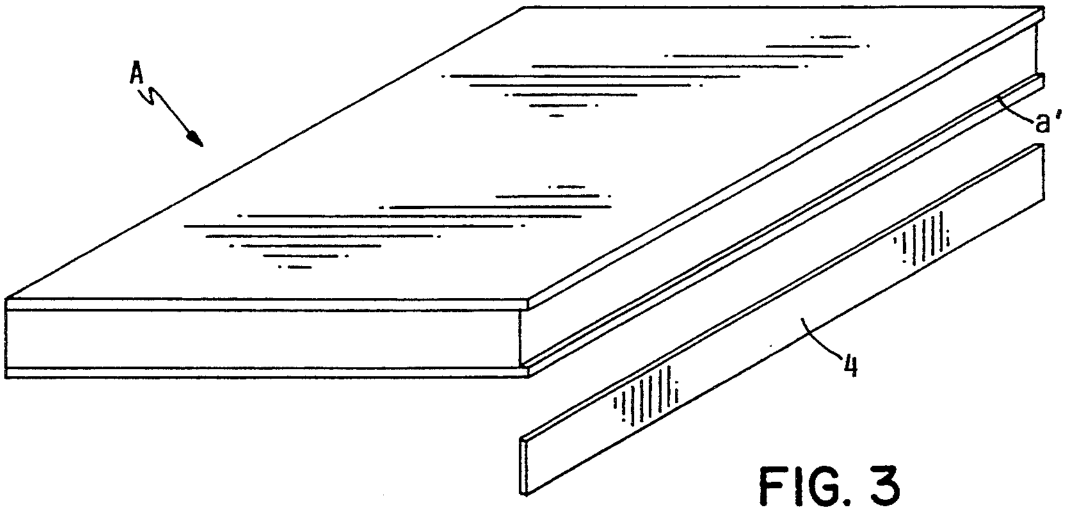
FIG. 3 represents a view of the panel in FIG. 2., in a subsequent operative sequence, where an insert of wood or wood origin can be associated to the groove so obtained, .
Figure 4:
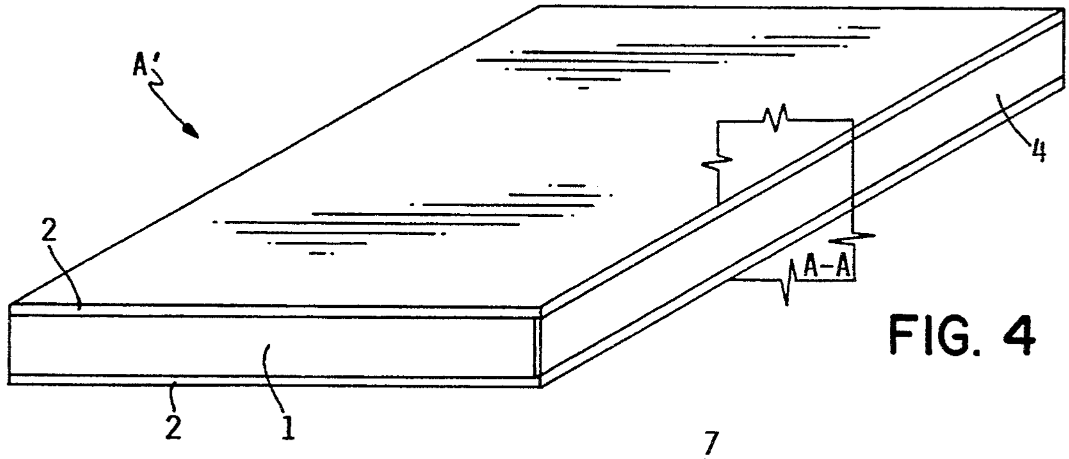
FIG. 4 represents a panel ready to be shaped along the border
Figure 5:
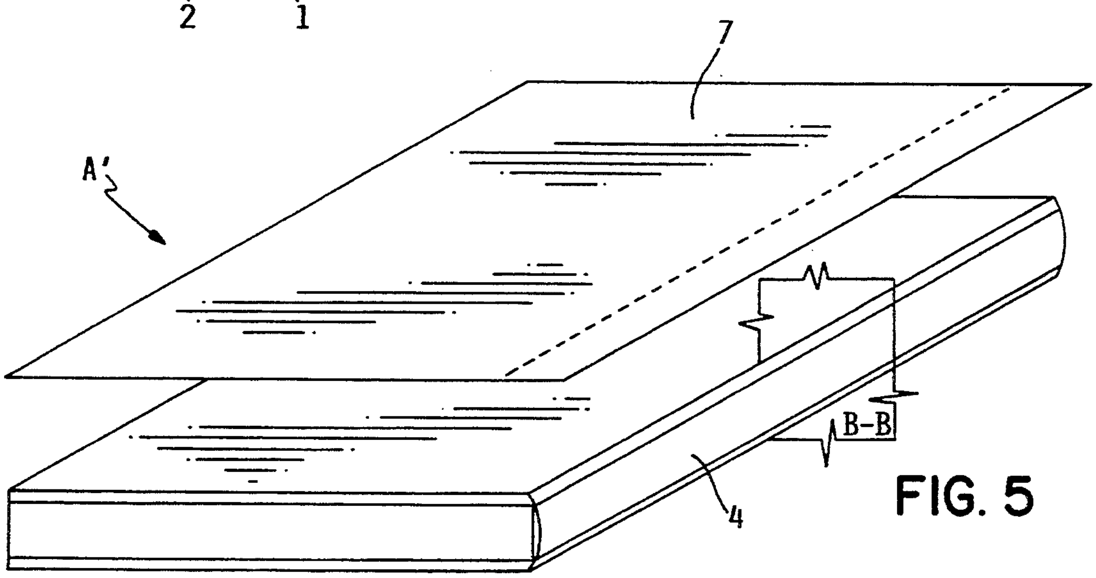
FIG. 5 represents the panel in FIG. 4 shaped completely along the border previously concerned and which is now ready to be covered.
Figure 6:
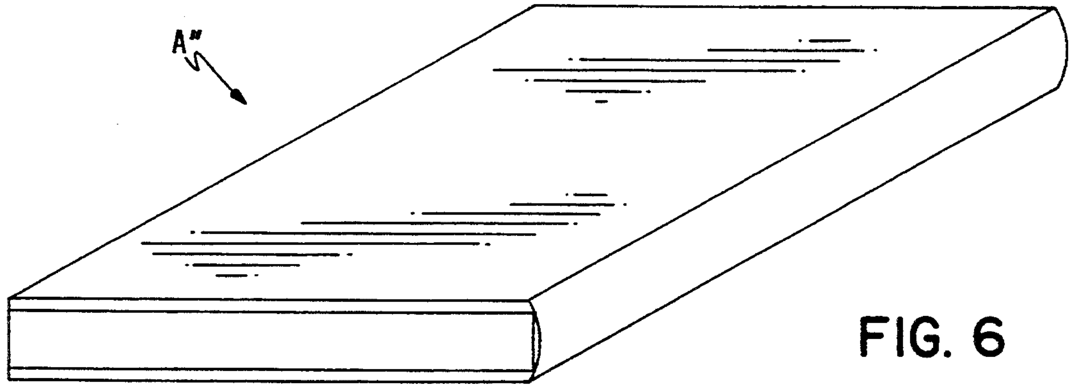
FIG. 6 represents a likely panel so obtained.
Figure 7:
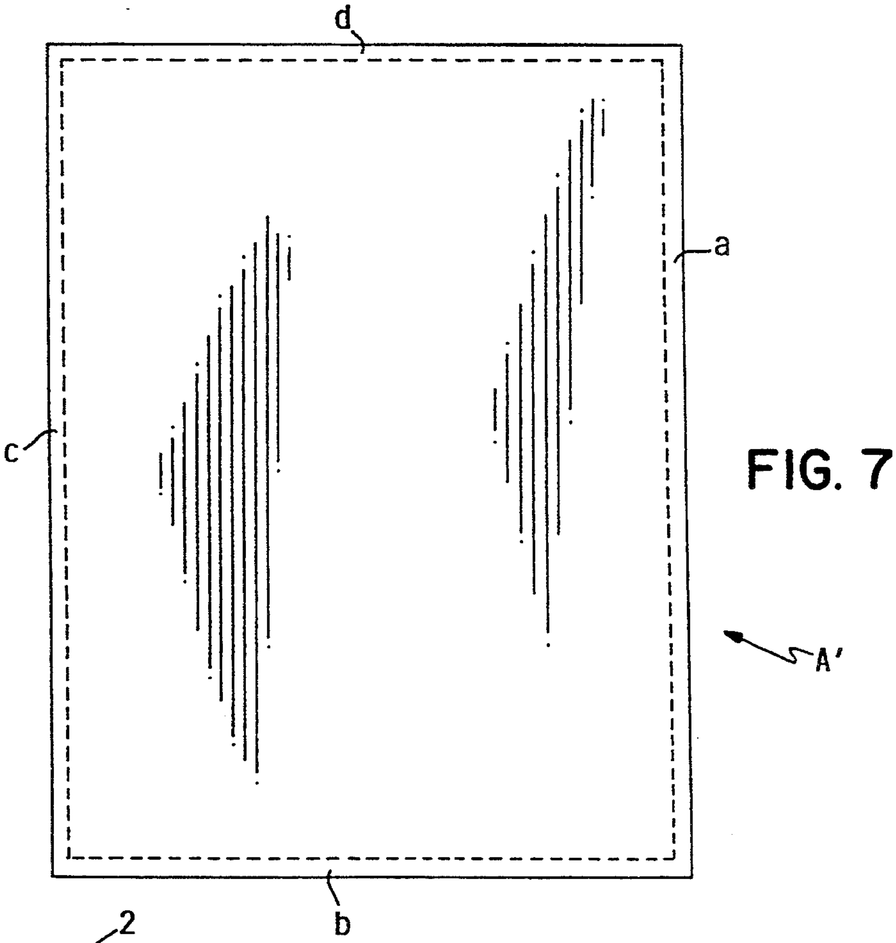
FIG. 7 represents the lop view of the panel, in which the procedure of border shaping has been carried out on all four sides.
Figure 8:
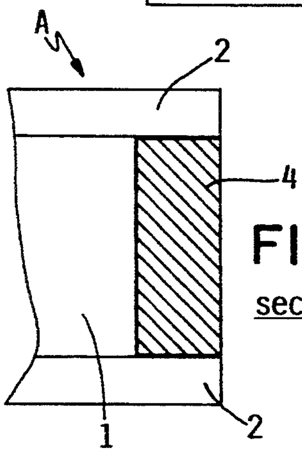
FIG. 8 represents a section view of the panel or the previous figure, taken in correspondence o the border on the plane A—A of FIG. 4.
Figure 9:
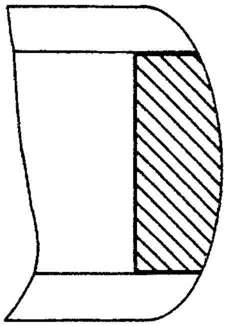
FIG. 9 represents a section view of the panel of the previous figure, taken from the plane B—B of FIG. 5.
Figure 10:
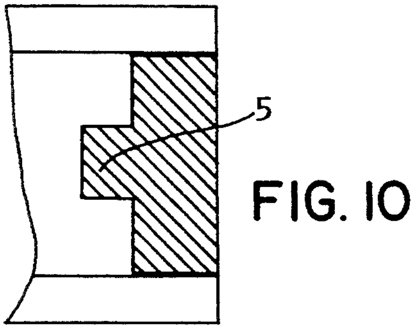
Figure 11:
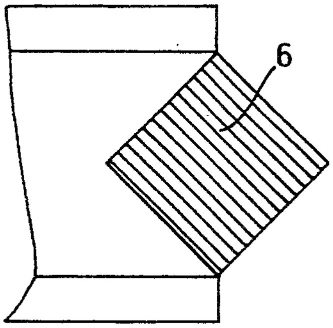

Lastly, the FIGS. 10 and 11 represent respectively possible alternative solutions of different milling sections obtainable along the border concerned.

Referring to the above figures displayed it is shown that a raw panel (A) in chip-board consists of a sandwich structure of differentiated agglomerate, having three super-imposed layers, the intermediate one obtained with large chips (1), and the two superficial layers (2) that form the surfaces, obtained with smaller particles.

This described procedure foresees the removal by milling of chip material (1) to a depth of a few millimeters and a maximum depth of about. 2 cm., in proximity of one, for example (a), of the four sides (a, b, c, d) of the panel (A) which form the external border. The milling of the panel (A), along the border (a) concerns only the thickness of the chip-board layer (1) of large chip particles, and in this case produces a lengthwise groove (a) the transverse section of which is rectangular, thus obtaining two opposite containment edges (3) relating to the thickness of the superimposed layers (2) of smaller chip particles.

Strips or inserts (4) arc previously obtained in solid wood, or other pseudo-wood materials for example "MDF", not excluding the eventual use of plastic materials for example "abs". The section of the strip (4) will be naturally analogous to that obtained from the groove (a) 10 allow the fitting of the said strip (4) to its interior. In order to firmly fix the strip (4) to the panel (A), said site (a) is firstly spread with glue, by spraying techniques or similar, and then associated to the strip, until the panel (A) is completed.

Finally, we proceed with a finishing cycle, in which the panel (A) is shaped in correspondence to the border (a) concerning the interpenetration of the strip (4), and conveniently covered on the upper half (7) for example by post-forming technique, until we obtain the finished panel in its final configuration (A").

In the FIGS. 10 and 11, possible variations of the above mentioned procedure are illustrated, in particular referring to alternative sections obtainable instead of the rectangular one. More particularly said procedures always concern the intermediate area (1) formed by an agglomerate of large chips, but whilst the solution in FIG. 10 has an added planing process to form a tooth (5) to insert in the corresponding groove, the solution proposed in FIG. 11, is more convenient being formed from a rhomboidal clement (6) which requires only multi-blade sectioning and curling beforehand and a corresponding groove in the area (1) of the panel (A) with a wedge section whose sides are substantially wide apart and contact the layers (2) made of the smaller chip particles.

We claim:

1. In a method for preparation of a panel for receiving a covering sheet of paper, polyvinyl chloride, and laminates, wherein the panel comprises an interior layer of large pressed chip particles and respective covering layers of small pressed chip particles, the improvement comprising:

a) milling an edge groove in the large pressed chip particles, having a width that extends to the respective covering layers of small pressed chip particles;
b) applying a liquid adhesive in the edge groove so formed;
c) inserting an edge strip having a width dimension conforming to the edge groove width into said edge groove; and
d) finishing the panel and edge strip combination in preparation for receiving said covering sheet.

2. The method of claim 1, wherein the step of milling an edge groove further comprises milling an edge groove having a rectangular cross section.

3. The method of claim 2, wherein the edge groove is milled to a depth equal to the thickness of the edge strip.

4. The method of claim 3, wherein said edge strip is formed from solid wood.

5. The method of claim 1, wherein said edge strip has a rhomboidal cross section and said edge groove is milled in conforming rhomboidal cross section.

* * * * *

UNITED STATES PATENT AND TRADEMARK OFFICE

CERTIFICATE OF CORRECTION

PATENT NO. : 5,433,806

DATED : July 18, 1995

INVENTOR(S) : Guido Pasquali; Lorenzo Pasquali

It is certified that error appears in the above-indentified patent and that said Letters Patent is hereby corrected as shown below:

In column 2, line 1, "pro-forming" should be -- pre-forming --; in column 2, line 63, "al" should be -- at --.

In column 3, line 14, "pro-forming" should be -- pre-forming --; in column 3, line 16, "he" should be -- the --; in column 3, line 41, "al the slate" should be -- at the state --.

In column 4, line 34, "lop" should be -- top --; in column 4, line 37, "or" should be -- of --; in column 4, line 38, "o" should be -- to --; in column 4, line 64, "arc" should be -- are --.

In column 5, line 1, "10" should be -- to --.

Signed and Sealed this

Seventeenth Day of October, 1995

Attest:

Bruce Lehman

BRUCE LEHMAN

*Attesting Officer*

*Commissioner of Patents and Trademarks*